US010540500B2

United States Patent
Filimon et al.

(10) Patent No.: US 10,540,500 B2
(45) Date of Patent: Jan. 21, 2020

(54) METHOD OF SECURELY BOOTING A COMPUTER SYSTEM AND A COMPUTER SYSTEM

(71) Applicant: Fujitsu Technology Solutions Intellectual Property GmbH, München (DE)

(72) Inventors: Diana Filimon, München (DE); Jürgen Atzkern, München (DE); Thilo Cestonaro, München (DE); Timo Bruderek, München (DE)

(73) Assignee: Fujitsu Client Computing Limited, Kawasaki (JP)

( * ) Notice: Subject to any disclaimer, the term of this patent is extended or adjusted under 35 U.S.C. 154(b) by 92 days.

(21) Appl. No.: 15/578,049

(22) PCT Filed: Mar. 18, 2016

(86) PCT No.: PCT/EP2016/055968
§ 371 (c)(1),
(2) Date: Nov. 29, 2017

(87) PCT Pub. No.: WO2016/192867
PCT Pub. Date: Dec. 8, 2016

(65) Prior Publication Data
US 2018/0150637 A1    May 31, 2018

(30) Foreign Application Priority Data
May 29, 2015 (DE) .......................... 10 2015 108 504

(51) Int. Cl.
*G06F 1/24* (2006.01)
*G06F 21/57* (2013.01)
(Continued)

(52) U.S. Cl.
CPC .......... *G06F 21/575* (2013.01); *G06F 21/572* (2013.01); *G06F 9/4401* (2013.01); *G06F 21/72* (2013.01); *G06F 2221/033* (2013.01)

(58) Field of Classification Search
CPC ...... G06F 21/575; G06F 21/527; G06F 21/72; G06F 2221/033
(Continued)

(56) References Cited

U.S. PATENT DOCUMENTS

2007/0180536 A1*  8/2007  Kanai ................... G06F 21/31
                                                                726/30
2008/0082828 A1*  4/2008  Jennings ............... G06F 21/72
                                                               713/176
(Continued)

FOREIGN PATENT DOCUMENTS

EP    1 953 666 A2    8/2008
WO    2014/175862 A1  10/2014

OTHER PUBLICATIONS

Garfinkel, T., et al., "Terra: A Virtual Machine-Based Platform for Trusted Computing", *Proceedings of the ACM Symposium on Operating Systems Principles*, Oct. 19, 2003, pp. 193-206.

*Primary Examiner* — Volvick Derose
(74) *Attorney, Agent, or Firm* — DLA Piper LLP (US)

(57) ABSTRACT

A method of securely booting a computer system includes executing program code of at least one boot loader to load a kernel; verifying, during loading of the kernel, the program code of the boot loader after at least a part of the program code of the boot loader has been executed; and interrupting the booting if a result of the verifying of the program code of the boot loader indicates a manipulation of the program code of the boot loader.

5 Claims, 3 Drawing Sheets

(51) Int. Cl.
    *G06F 9/4401*    (2018.01)
    *G06F 21/72*    (2013.01)
(58) Field of Classification Search
    USPC .............................................................. 713/2
    See application file for complete search history.

(56) References Cited

U.S. PATENT DOCUMENTS

| | | | |
|---|---|---|---|
| 2008/0215872 A1* | 9/2008 | Choi .................... | G06F 21/575 713/2 |
| 2009/0193211 A1* | 7/2009 | Hu ........................ | G06F 21/575 711/163 |
| 2009/0327678 A1* | 12/2009 | Dutton .................. | G06F 21/575 713/2 |
| 2010/0049961 A1* | 2/2010 | Liao ........................ | G06F 8/65 713/2 |
| 2013/0227264 A1* | 8/2013 | Kim ..................... | G06F 21/575 713/2 |
| 2015/0200934 A1* | 7/2015 | Naguib ................. | G06F 21/575 713/2 |
| 2016/0087801 A1* | 3/2016 | Jones ................... | H04L 9/3247 713/176 |

* cited by examiner

METHOD OF SECURELY BOOTING A COMPUTER SYSTEM AND A COMPUTER SYSTEM

TECHNICAL FIELD

This disclosure relates to a method of securely booting a computer system as well as a computer system having a device that verifies program code of a boot loader.

BACKGROUND

In computer systems having security-critical applications, even the booting process of the computer system must be verified and secured. Such computer systems are used e.g. for authentication in or execution of payment transactions of users. A user can authenticate himself/herself by entering codes or biometric data. In the booting process of the computer system, the software, firmware and processes of the booting process per se are verified to make it more difficult for unauthorized third parties to access the computer system and thus gain access to personal data. In this way, it can be ensured that secure and original firmware and hardware execute the booting process within the computer system.

There is nonetheless a need to provide an improved method of operating such a computer system as well as an improved computer system.

SUMMARY

We provide a method of securely booting a computer system including executing program code of at least one boot loader to load a kernel; verifying, during loading of the kernel, the program code of the boot loader after at least a part of the program code of the boot loader has been executed; and interrupting the booting if a result of the verifying of the program code of the boot loader indicates a manipulation of the program code of the boot loader.

We also provide a computer system including a memory for a program code of a boot loader, a central processing unit and a device that verifies the program code of the boot loader, wherein the central processing unit is configured to execute the boot loader and load a kernel, and the device is electrically coupled with the memory and the central processing unit and is configured to perform, during loading of the kernel, a verification of the program code of the boot loader after at least a part of the program code of the boot loader has been executed, and to interrupt the booting of the computer system if a result of the verification of the program code of the boot loader indicates a manipulation of the program code of the boot loader.

We further provide a computer system including a secure memory sector, a central processing unit and a crypto processor, wherein the crypto processor is arranged to start an emulation of an SPI module in the secure memory sector upon reception of a power-on signal and the central processing unit is arranged to execute program code of at least one boot loader out of the crypto processor.

LIST OF REFERENCE CHARACTERS

Figure 1:
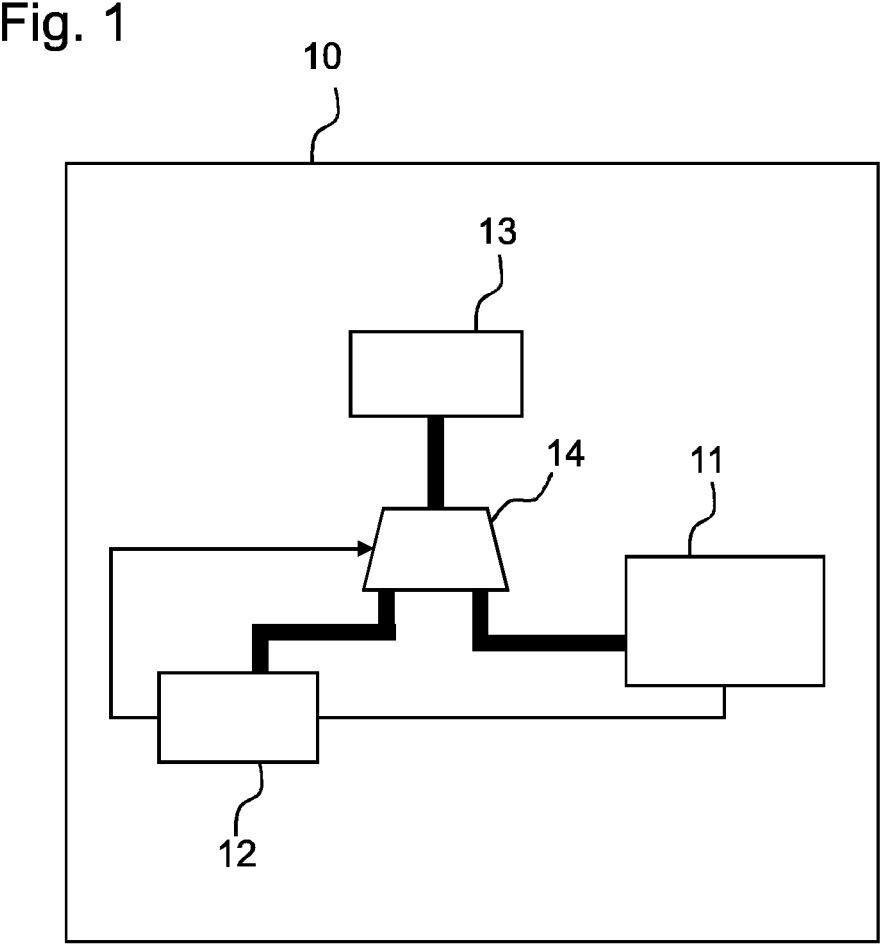
FIG. 1 shows a computer system according to a configuration.

10, 30 Computer system
11, 31 Central processing unit
12, 32 Crypto processor
13 SPI module
14 Multiplexer
33 Secure memory sector
21-27 Method steps

DETAILED DESCRIPTION

Our method includes the steps of:
executing program code of at least one boot loader for loading a kernel;
verifying the program code of the boot loader after at least a part of the program code of the boot loader has been executed; and
interrupting the booting process, if a result of the verifying of the program code of the boot loader indicates a manipulation of the program code of the boot loader.

After the start of the computer system, a boot loader is executed. Loading a kernel of the computer system is initiated by the boot loader. The program code of the boot loader is verified after at least a part of the program code of the boot loader has been executed. By verification of the boot loader, after part of the program code of the boot loader has already been executed, the computer system can be booted more quickly than when the program code of the boot loader has been verified before the boot loader is being executed.

If it is recognized during the verification process that the program code of the boot loader has been manipulated, booting is interrupted. Thus, security of the computer system is maintained since the computer system does not completely boot without performing a verification of the boot loader.

In this context, the booting includes the sequence in the computer system from a power-on signal to the assumption of a normal operating state.

Advantageously, the computer system may include a central processing unit and a crypto processor. Here, the kernel is loaded by the central processing unit. Verification is performed in the crypto processor. The crypto processor also performs the interruption of the booting process, in particular by sending a reset signal to the main processor.

Verification of the program code of the boot loader by a crypto processor leads to a high security standard. Verification by the crypto processor is done simultaneously with booting the computer system. As a result, booting is accelerated compared to a booting process that includes a previous verification.

Advantageously, the step of verifying may be performed after an execution of the program code of the boot loader has been completed and at least a part of the kernel has been loaded.

The program code of the boot loader is stored in any memory that can be addressed separately such as a non-volatile memory module, in particular an SPI module. After loading the kernel, the central processing unit does not access the memory of the program code of the boot loader so that the verification can be performed by the crypto processor which is independent from the central processing unit.

The verification step may be performed after lapse of a predetermined time after loading of the kernel has been started.

To ensure smooth progress of verification in the booting process, a time preset that starts along with the start of the loading of the kernel allows specifying the time when the verification is to be effected.

The step of interrupting may include stopping the central processing unit.

The booting process is interrupted by stopping the central processing unit. The computer system does not reach a normal operating state in which malware could be executable. Malware programs that may possibly have been started are aborted just like the booting process per se. In particular, the central processing unit is stopped by a reset. For example, the supply voltage of the central processing unit is interrupted.

The computer system may additionally include a multiplexer and an SPI module. The program code of the at least one boot loader is stored in the SPI module. The central processing unit, the crypto processor and the SPI module electrically connect to the multiplexer. In this configuration, prior to the step of execution, the following step is additionally executed:

switching the multiplexer by the crypto processor such that an electric connection from the SPI module to the central processing unit is established.

After the power-on signal, the crypto processor configures the multiplexer such that a connection is established between the SPI module and the central processing unit. As a result, the central processing unit can load the program code of the at least one boot loader from the SPI module.

After the step of executing the program code, the crypto processor may additionally perform the following step before the step of verifying is executed:

switching the multiplexer by the crypto processor so that an electric connection from the SPI module to the crypto processor is established.

For the step of verifying, an electric connection is established between the crypto processor and the SPI module. This connection is established by switching the multiplexer by the crypto processor. Here, an electric connection between the SPI module and the central processing unit is interrupted. During verification of the program code of the boot loader, the central processing unit executes the kernel. Here, there is no need for the kernel to access the SPI module. Thus, the crypto processor can verify the content of the SPI module at the same time. Subsequently, a connection between SPI module and central processing unit can be re-established by the crypto processor.

We also provide a computer system having a memory for a program code of a boot loader, a main processor and a device that verifies the program code of the boot loader. Here, the central processing unit is configured to execute the boot loader and load a kernel. The device is electrically coupled to the memory and the central processing unit. The device is configured to perform a verification of the program code of the boot loader after at least a part of the program code of the boot loader has been executed. Furthermore, the device is configured to interrupt booting of the computer system if verification of the program code of the boot loader indicates a manipulation of the program code of the boot loader.

Such a computer system can rapidly boot while at the same time ensuring a high security standard.

The device that verifies the program code of the boot loader may include a crypto processor.

The computer system may comprise an SPI module in which the memory is arranged.

The electric coupling of the device to the memory and the central processing unit may include a multiplexer.

Advantages regarding our computer system result from advantages regarding our method as well as from the examples described below.

FIG. 1 shows a schematic illustration of a computer system 10. In the illustrated example, the computer system 10 is a payment terminal by which a user can perform electronic payment transactions. In other examples, the computer system 10 can e.g. be a cell phone, a tablet PC or a desktop computer. As a matter of fact, other types of computer systems are possible as well.

The computer system 10 comprises a central processing unit 11. The central processing unit 11 executes processes of the computer system 10. An operating system is running on the central processing unit 11, for example. In the example, the central processing unit 11 is a so-called system on a chip. In this case, the central processing unit 11 can assume various functions, which can be distributed to various components e.g. in other examples, such as a desktop computer.

The computer system 10 further comprises a memory module with a serial peripheral interface, SPI for short. In the example, the SPI module 13 includes a memory sector on which program code of a boot loader is stored. Here, the boot loader includes a first stage boot loader and a second stage boot loader. After a power-on signal of the computer system 10 and an initialization of the first stage boot loader, the second stage boot loader is automatically started by the first stage boot loader and executed subsequently. The aim of the boot loader is to prepare the computer system 10 for loading of the operating system and thus for a normal operating state. In particular, booting includes execution of a system bootstrap, a first stage boot loader and a second stage boot loader as well as the complete loading of a kernel, an initram file system and a root file system.

For execution of an operating system, a kernel is loaded by the central processing unit 11. Loading the kernel is initialized by the second stage boot loader. Here, the central processing unit loads the kernel from a further memory connected to the central processing unit. In another example, the central processing unit loads the kernel from the SPI module 13.

In the example, the central processing unit 11 and the SPI module 13 are connected through a multiplexer 14. In addition, a crypto processor 12 connects to the multiplexer 14. In the preferred example, the crypto processor 12 is a chip having a high security standard and the firmware of which can be programmed for security verifications. The crypto processor 12 can control the multiplexer 14. In particular, the crypto processor 12 can switch a connection of the SPI module from the central processing unit 11 to the crypto processor 12. Here, either the crypto processor 12 or the central processing unit 11 is electrically coupled to the SPI module 13.

Furthermore, the crypto processor 12 is electrically coupled to the central processing unit 11 so that the crypto processor 12 can send at least a reset signal to the central processing unit 11.

Figure 2:
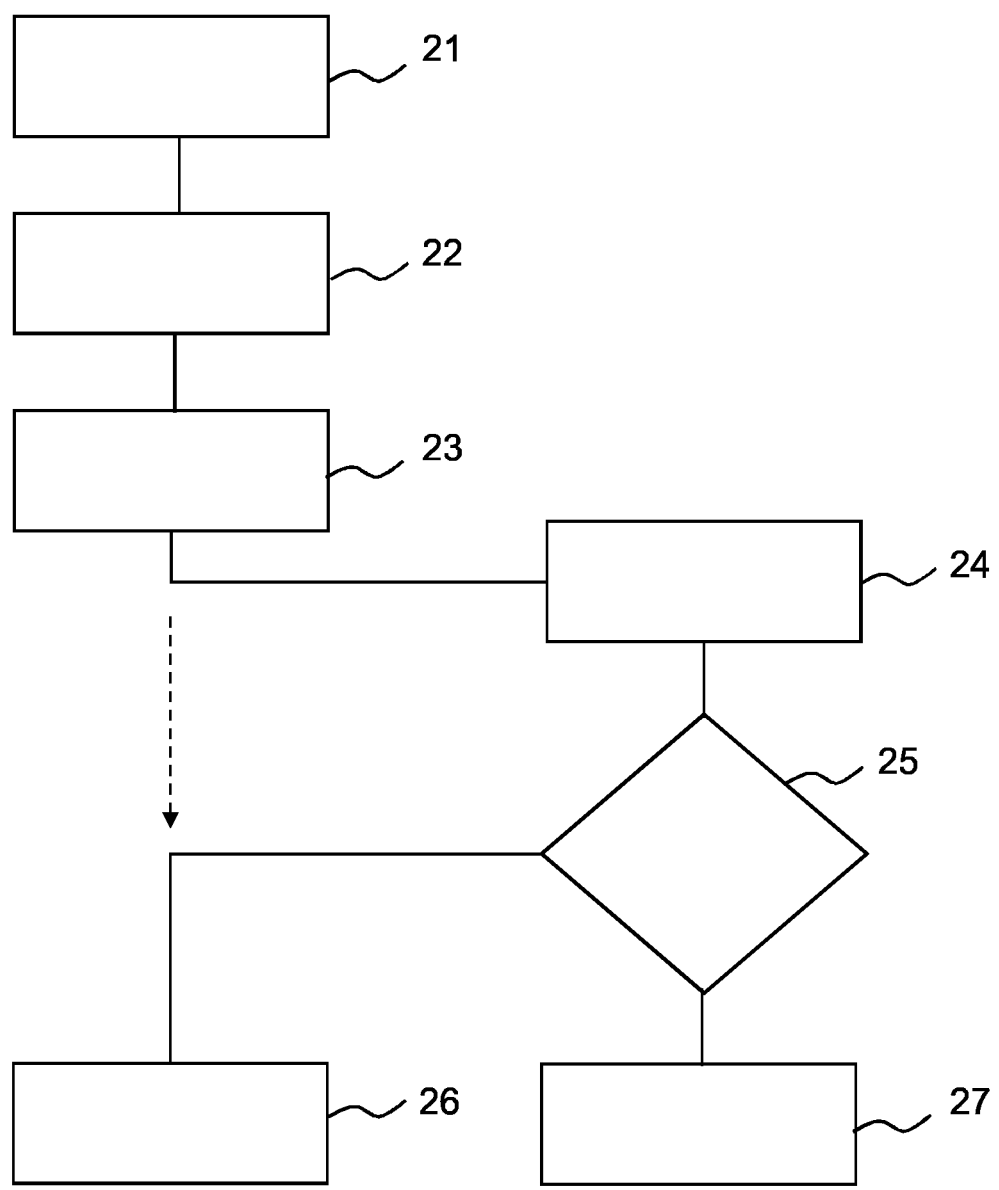
FIG. 2 is a flow chart of a method according to a configuration.

FIG. 2 shows a flow chart for a method of operating the computer system 10 according to the above described example. After starting the computer system 10, the crypto processor 12 controls the multiplexer 14 such that the multiplexer establishes an electric connection between the SPI module 13 and the central processing unit 11.

In step 22, the boot loader is loaded and executed. This includes loading and executing the first stage boot loader and the second stage boot loader. Here, the second stage boot loader is loaded by the first stage boot loader since the memory of the first stage boot loader is too small to address and initialize all periphery.

After execution of the boot loader in step 22, loading of the kernel is started in the central processing unit 11 in step 23. In the example, the central processing unit 11 does not access the SPI module 13 while loading the kernel.

Due to the fact that the SPI module 13 is not addressed by the central processing unit 11 during loading of the kernel, the crypto processor 12 can access the SPI module and execute the security-relevant verification of the program code of the boot loader. To that end, the crypto processor 12 controls the multiplexer in step 24 such that an electric connection is established between the SPI module 13 and the crypto processor 12. The electric connection between the SPI module 13 and the central processing unit 11 is interrupted here.

In the example, in step 24, the crypto processor 12 switches the multiplexer 14 five seconds after the start of the loading of the kernel in step 23. In an alternative configuration, the crypto processor switches the multiplexer in step 24 after a time lapse depending directly on the first switching of the multiplexer in step 21. Here, the boot loader is provided with a predetermined time interval to initialize the loading of the kernel.

Now, in step 25, the crypto processor 12 starts to verify the program code stored in the SPI module 13. In particular, the program code of the boot loader, respectively the first stage boot loader and/or the second stage boot loader, is verified.

To that end, the crypto processor forms a hash value from the storage data of the SPI module 13, which is verified by the crypto processor 12 through a reference value. To that end, the reference value or a look-up table including the reference value is stored in a secure memory of the crypto processor. In another example, the reference value is stored in an external memory connected with the crypto processor.

If the verification result is positive, it is to be assumed that the program code of the boot loader is okay. The computer system 10 continues with the booting process until step 26 and thus finishes the booting without interruption by the crypto processor 12. In this case, the central processing unit 11 completely loads the kernel and subsequently starts an operating system. The fact that the booting process is not affected by the crypto processor, is indicated by the dashed arrow in FIG. 2.

If the result of the verification in step 25 in negative, this indicates a manipulation of the program code of the boot loader in the SPI module 13. Now, in step 27, the crypto processor 12 sends a reset signal to the central processing unit 11. The energy supply of the central processing unit 11 is interrupted by the reset signal and the booting process is immediately aborted. In the example, the reset signal is sent to the central processing unit 11 via a GPIO (general purpose input output) pin of the crypto processor 12.

The crypto firmware can set a marking in a so-called tamper register in addition to setting the reset signal. As a result, it is stored that a manipulation has been detected. A warning signal can be output though a status indicator, e.g. an LED display. The status indicator is connected to both the central processing unit 11 and the crypto processor 12. Through setting of the reset signal at the central processing unit 11, the central processing unit neither has a voltage nor access to the status indicator. Thus, the status indicator is controlled by the crypto processor 12. In this way, it is ensured that the status indicator, which indicates a manipulation, is also controlled by the crypto processor 12.

Figure 3:
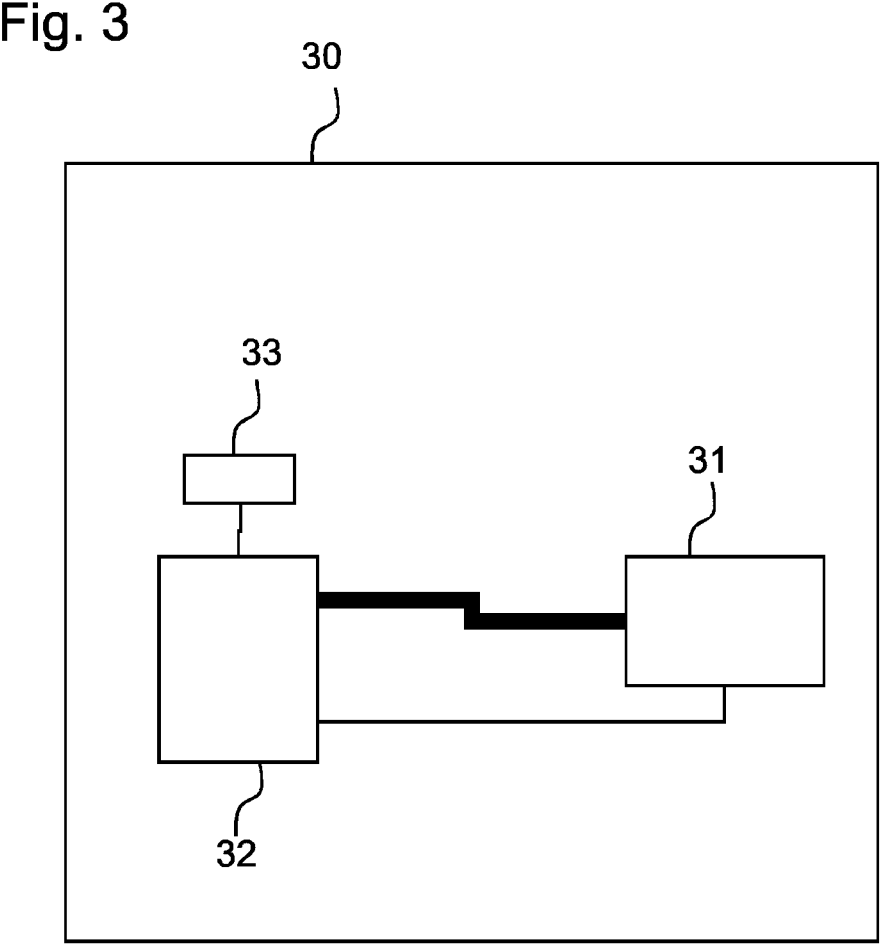
FIG. 3 shows another configuration of the computer system.

An alternative method illustrated in FIG. 3 to ensure a secure and fast booting of the computer system 10 is to emulate an SPI module in the crypto processor 32. In this case, a computer system 30 does not have any physical SPI module on which a boot loader is stored. Just as well, the computer system 30 does not comprise a multiplexer. The crypto processor 32 is directly electrically coupled with the central processing unit 31.

If the crypto processor receives a power-on signal, the crypto processor 32 starts an emulation of an SPI module in the crypto processor 32. To that end, a secure memory sector 33 is used. The secure memory sector 33 is e.g. a secure EEPROM. The secure memory sector 33 connects to the crypto processor 32 via a secure connection to which only the crypto processor 32 has access. In an alternative example, the secure memory sector 33 is located within the crypto processor 32.

By realization of the emulation of an SPI module in the secure memory sector 33 of the crypto processor 32, a secure anchor to start a secure program code verification in the first stage boot loader is achieved. Starting from this secure anchor, further program code can securely be executed. The crypto processor 32 and the firmware stored on the crypto processor 32 is considered a trusted element and thus trustworthy. A programming of the boot loader stored in the secure memory sector 33 or of the program code of the boot loader can exclusively be effected through a secure algorithm of the crypto processor 32 (flash algorithm). Thus, it is ensured that unauthorized third parties are not able to put program code on the crypto processor 32.

After emulation of the memory module, the boot loader, in particular the first stage boot loader and the second stage boot loader, can be executed out of the crypto processor 32. Due to the fact that emulation of the SPI module 13 takes place in the crypto processor 32, verification of the program code of the boot loader is not necessary. Thus, the computer system 30 can directly boot through and does not require any interruption or verification of the program code of the boot loader.

The invention claimed is:

1. A method of securely booting a computer system having a central processing unit, a crypto processor, a multiplexer and an SPI module, the program code of the at least one boot loader being stored in the SPI module and the central processing unit, the crypto processor and the SPI module being electrically connected to the multiplexer, the method comprising the following steps:
   switching said multiplexer by said crypto processor so that an electrical connection is established from said SPI device to said central processing unit;
   switching the multiplexer by the crypto processor after the step of executing the program code of the at least one bootloader to establish an electrical connection from the SPI device to the crypto processor and interrupt the electrical connection between the SPI device and the central processing unit;
   executing program code of at least one boot loader to load a kernel after the step of switching the multiplexer, wherein the kernel is loaded by the central processing unit;
   verifying, during loading of the kernel, the program code of the boot loader by said crypto processor after an electrical connection from said SPI device to said crypto processor has been established, after at least a part of the program code of the boot loader has been executed; and interrupting the booting by the crypto processor if a result of the verifying of the program code of the boot loader indicates a manipulation of the program code of the boot loader.

2. The method according to claim 1, wherein the verifying is executed after execution of the program code of the boot loader has been completed and at least a part of the kernel has been loaded.

3. The method according to claim 1, wherein verifying is executed after elapse of a predetermined time after loading of the kernel had been started.

4. The method according to claim 1, wherein the interrupting includes stopping the central processing unit processor.

5. A computer system comprising:
a memory for a program code of a boot loader,
an SPI module in which the memory is arranged,
a central processing unit, and
a device that verifies the program code of the boot loader,
    wherein the central processing unit is configured to execute the boot loader and load a kernel, and the device is electrically coupled with the memory and the central processing unit and is configured to perform, during loading of the kernel, a verification of the program code of the boot loader after at least a part of the program code of the boot loader has been executed, and to interrupt the booting of the computer system if a result of the verification of the program code of the boot loader indicates a manipulation of the program code of the boot loader,
the device that verifies the program code of the boot loader includes a crypto processor,
the electric coupling of the device to the storage and the central processing unit includes a multiplexer, and
the multiplexer is controlled by the device that verifies the program code of the boot loader.

* * * * *